No. 668,585. Patented Feb. 19, 1901.
A. RÓNAY.
BRICK FROM IRON ORE AND PROCESS OF MAKING SAME.
(Application filed Aug. 3, 1900.)
(No Model.) 2 Sheets—Sheet 1.
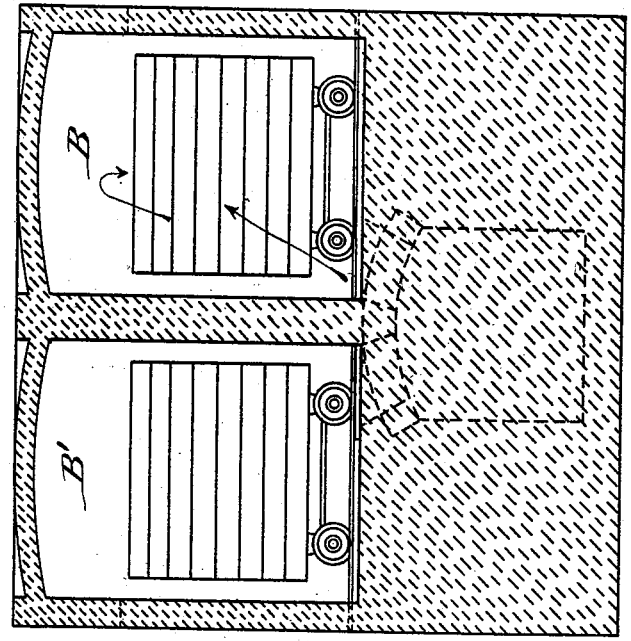
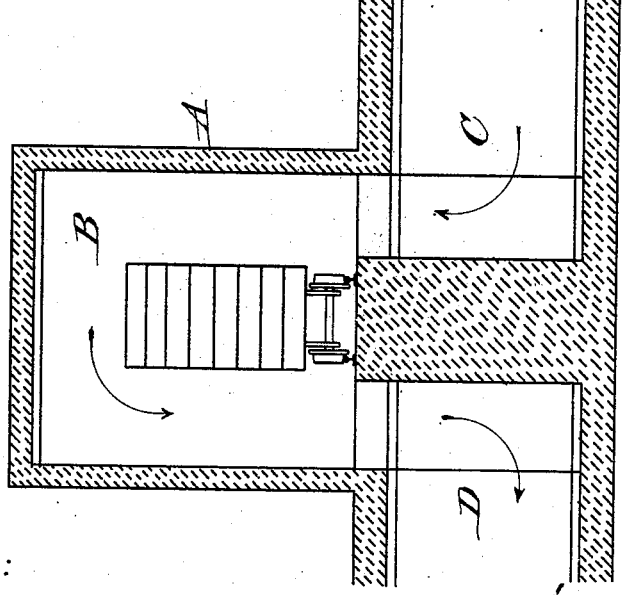
Witnesses: Inventor:
Anton A. Floetzner Árpád Rónay,
M. C. Massie. by May Stringü
Attorney
THE NORRIS PETERS CO., PHOTO-LITHO., WASHINGTON, D. C.

No. 668,585. Patented Feb. 19, 1901.
A. RÓNAY.
BRICK FROM IRON ORE AND PROCESS OF MAKING SAME.
(Application filed Aug. 3, 1900.)
(No Model.)
2 Sheets—Sheet 2.
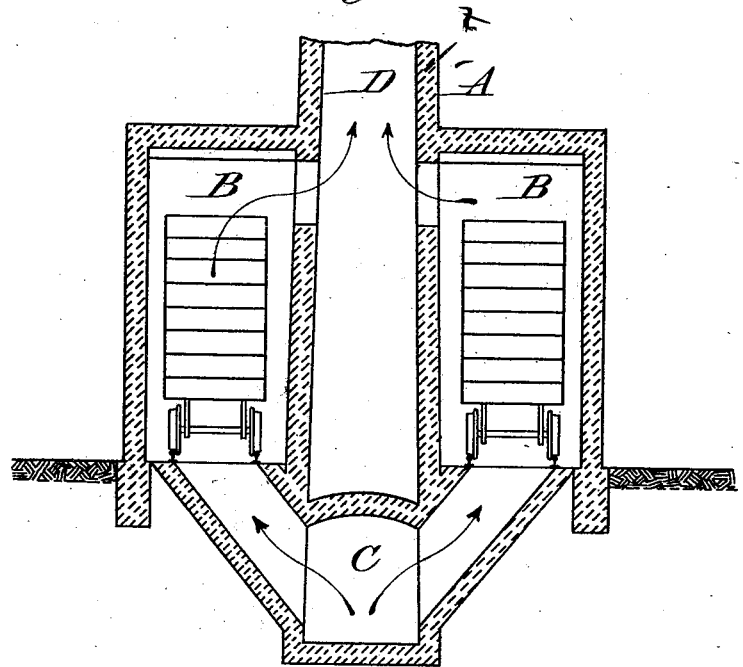
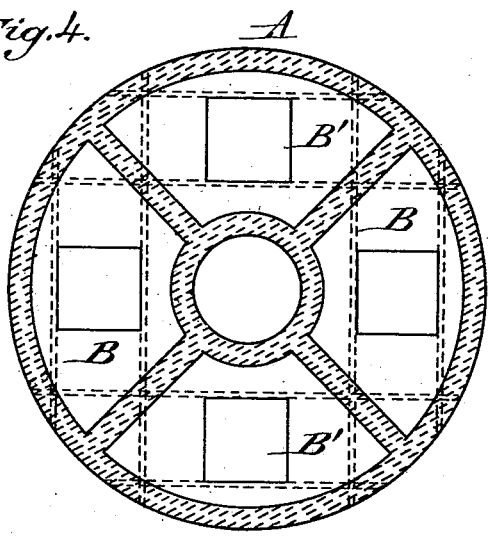
Witnesses:
Anton A. Hoefner
M. C. Massie
Inventor:
Árpád Rónay
by Mar H mgri
attorney

UNITED STATES PATENT OFFICE.

ÁRPÁD RÓNAY, OF BUDA-PESTH, AUSTRIA-HUNGARY.

BRICK FROM IRON ORE AND PROCESS OF MAKING SAME.

SPECIFICATION forming part of Letters Patent No. 668,585, dated February 19, 1901.

Application filed August 3, 1900. Serial No. 25,765. (No specimens.)

*To all whom it may concern:*

Be it known that I, ÁRPÁD RÓNAY, metallurgic engineer, a subject of the Emperor of Austria-Hungary, residing at Buda-Pesth, in the Empire of Austria-Hungary, have invented a new and useful Improvement in Bricks from Iron Ore and Process of Making the Same, of which the following is a specification.

This invention relates to bricks or briquets made from comminuted or pulverulent ore and the method of their manufacture, such bricks or briquets being designed to be subjected to the usual metallurgical or reducing processes for the purpose of obtaining metallic iron therefrom and for other uses in the arts.

One object of my invention is to provide blocks or briquets from pulverulent or other coarse or fine comminuted iron-containing materials or ores—for example, any comminuted ores or ironstone alone or mixed with the residues from iron pyrites or similar sulfur ores—in such a manner that these blocks shall be susceptible of being effectively submitted to the usual metallurgical operations in blast or other reducing furnaces by virtue of their highly-resisting and refractory qualities, whereby they will not be liable to collapse and be crushed in those zones of temperature preceding the reducing zone.

While my invention has considerable importance with reference to the above-mentioned metallurgical residues and to the utilization of waste ores, it is adapted also to a great variety of other more or less comminuted ores, such as crude hematites, ($Fe_2O_3$,) limonites, ($H_6Fe_4O_9$,) or calcined or roasted spathic iron,($Fe_2O_3$, FeO.) The chemical reaction taking place under my process is also applicable to magnetic iron ores and in general to every ironstone, residue from any of the pyrites, or other waste ore.

In the production of briquets or blocks from comminuted iron ores or residues the great difficulty hitherto encountered has been the fact that such briquets or blocks were not capable of withstanding the burden of the stack or blast furnaces or other furnaces for the reduction of iron and would hence crumble or collapse before they reached the reducing zone of the furnace, a result which, of course, is highly objectionable, as will be readily understood by those skilled in the art. On the other hand, where such briquets or blocks are coated with a layer of fritted or sintered material they are objectionable, because they will resist the reducing action more or less and are therefore not practicable for metallurgical purposes.

It is one of the main purposes of my invention to overcome the objections thus set forth; and with this and other purposes in view my invention consists in a block or briquet of ferruginous material, such as comminuted iron ore coated with a layer of carbonate of iron, and also in the process of preparing such blocks or briquets, which consists in submitting a mass containing iron to the action of oxidized carbon—such as carbon monoxid, carbon dioxid, or a mixture of both—at a temperature below that at which the carbonate of iron would be calcined, or, in other words, carbonic dioxid driven off.

My invention consists, moreover, in such other features, steps, and methods as will be hereinafter set forth, and particularly pointed out in the claims.

In carrying out my invention I take any coarse or fine comminuted ferruginous material, such as pulverulent iron ore alone or in combination with the powdered or ground iron-ore wastes or residues from the various iron-pyrite ores after the extraction of copper therefrom or other treatment, and form them into blocks or briquets in any well-known or convenient manner, sufficient moisture being supplied for the purpose of molding them, whereupon the blocks or briquets are dried, preferably air-dried. After this they are ready to be treated according to my invention.

I have attained very good results, for example, with a ferruginous material consisting of comminuted hematite, either alone or mixed with the residues from iron pyrites or copper and iron pyrites, such as what is known as "purple ore." The proportions in which these are mixed are not important so far as my process is concerned. The blocks or briquets formed as above are then coated with a layer of iron carbonate by subjecting them to the action of "oxidized carbon," under which term I include either carbon monoxid or carbon dioxid alone or a mixture of both, at a temperature at which carbonate of iron can be formed. This temperature I find to be between 380° and 700° centigrade. I have attained the best results by operating at a temperature between 380° and 500° centigrade. It is, however, to be understood that I do not limit myself to any temperatures except in so far as they are those at which iron carbonate can be formed and below that at which the carbonate will be decomposed.

The atmosphere of oxidized carbon may be supplied from any source and may be the products of combustion from any furnace or other waste gases containing oxidized carbon—such as escape, for example, from blast-furnaces or the like.

The percentage of carbon monoxid and carbon dioxid contained in the carbonating atmosphere should be governed by the particular nature of the ferruginous material employed. For example, where I employ ores which have been roasted or calcined, and therefore contain a sufficient quantity of FeO, or which already contain sufficient FeO in their natural state an atmosphere consisting entirely of carbon dioxid ($CO_2$) may be employed to advantage. When, however, ores are to be treated which contain little FeO, so that $Fe_2O_3$ must be reduced to FeO for the purpose of forming a sufficient quantity of $FeCO_3$ by the action of $CO_2$, the converting-gases must contain sufficient CO for this purpose, the temperatures being those indicated above. The amount of carbon dioxid and the presence or absence of carbon monoxid in the waste gases depends on whether the combustion takes place with or without an excess of oxygen, as will be readily appreciated. I have obtained good results in this direction from ores containing little FeO by subjecting them to converting-gases containing 5.7 parts, by volume, of carbon dioxid to 0.1 part carbon monoxid. I have also obtained very good briquets by subjecting ores which contained twenty-five to twenty-eight per cent. FeO to the action of waste or combustion gases in which CO was not continuously present.

In the accompanying drawings I have represented an apparatus in two modifications whereby my invention may be carried out. It is to be understood that these views represent only a few of the substantially unlimited number of kilns which may be employed for my purpose. In each case the arrangement of such a kiln must be governed largely by local conditions and also by the character of the material treated.

In the drawings, Figures 1 and 2 represent a vertical transverse section and a vertical longitudinal section, respectively, of one form of kiln for carrying out my process; Figs. 3 and 4, a vertical central section and a sectional plan, respectively, of still another form of kiln for this purpose.

By referring to the drawings it will be noted that in each case the kiln A comprises two chambers or sets of chambers B B', each of which is arranged in the path of the waste gases or products of combustion from a stack or other furnace, said gases arriving through the flue or duct C and after having entered one of the chambers or sets of chambers B and acted on their contents passing off or escaping through the outlets, flues, or ducts D. The briquets or blocks E to be carbonated are wheeled into the chamber B or B' on trucks F in a manner as will be readily understood, after which the said chamber will be bricked up or closed in the usual way.

I prefer to employ a pair of chambers or sets of chambers, so as to be able to operate continuously, so that while one chamber or set of chambers B is in operation the other chamber or set of chambers B' may be discharged and recharged with a fresh charge of briquets.

The operation of this apparatus will be readily understood. The charge or charges of briquets E are wheeled into one chamber or set of chambers B or B' on the truck or trucks F, and the chamber or set of chambers are then closed or walled up, and communication with the gas-duct C is opened, thus permitting the chemical action of the gases on the charge at the specified temperature. The charge or charges in the twin chamber or chambers after having undergone the desired change are then removed, preferably after first closing off the communication between the chambers and the gas duct or flue, and a new charge or charges are then introduced and the chambers closed and put into communication with the gas-flue, whereupon the charges in the first chamber or set of chambers may be removed after having been sufficiently coated, and so on, the operation of the twin kiln being continuous.

The briquets or blocks made according to the above process will on chemical analysis be found to be covered with a coating consisting of carbonate of iron, ($FeCO_3$.) The thickness of this coating depends on the time during which the oxidized carbon-gases have acted on the bricks. I find it preferable to act upon them until about thirty per cent. of their iron has been converted into the carbonate. This carbonation is principally due to the action of the carbon dioxid ($CO_2$) contained in the waste gases. However, the carbon monoxid (CO) which exists in all waste gases from chimneys, furnaces, &c., where the combustion is not complete also exerts an important influence in this process of conversion, due probably to the fact that the same reduces ferric oxid ($Fe_2O_3$) or ferrous-ferric oxid, ($Fe_2O_3.FeO$ or $Fe_3O_4$,) the lower oxid, (FeO,) which latter alone can be carbonated by the carbon dioxid. As above stated, when the ore originally contains a large amount of FeO the carbon dioxid alone will be sufficient to form the carbonate-of-iron crust. This crust is of sufficient strength and tenacity to prevent the collapsing or crumbling of the briquet in the blast or other reducing furnace until it reaches the reducing zone, at which point no bad results will follow a crumbling of the briquets. At the same time this coating or crust of ferrous carbonate will not in any way interfere with the reducing action of the furnace, but, on the contrary, being identical in composition with siderite or spathic iron ore ($FeCO_3$) it will undergo reduction as readily as the latter.

What I claim, and desire to secure by Letters Patent of the United States, is—

1. As a new article of manufacture, a block or briquet composed substantially of comminuted iron ore and having an exterior crust of carbonate of iron.

2. As a new article of manufacture, a block or briquet comprising a mixture of comminuted iron ore and residues from iron pyrites and provided with an exterior crust of carbonate of iron.

3. The process of forming briquets or blocks containing comminuted iron ore which consists in submitting masses of such material to the action of oxidized carbon-gases at a heat below the point where carbonate of iron is decomposed and at a temperature at which carbonate of iron will be formed.

4. The process of forming briquets or blocks containing comminuted iron ore which consists in submitting masses of such material to oxidized carbon-gases at a heat below about 700° centigrade, and at a temperature at which carbonate of iron will be formed.

5. The process of forming briquets or blocks containing comminuted iron ore containing the higher oxids of iron which consists in submitting masses of such materal to the action of a mixture of carbon monoxid and carbon dioxid at a temperature where carbonate of iron will be formed and below the point where carbonate of iron is decomposed.

6. The process of forming resisting and refractory iron-ore briquets which consists in submitting air-dried masses of iron ore to the action of gases containing oxidized carbon at a temperature where a crust of carbonate of iron is formed and no sintering or fritting action takes place.

In testimony whereof I affix my signature in presence of two witnesses.

ÁRPÁD RÓNAY.

Witnesses:
ADOLPH FISCHER,
CARL FLINT.